United States Patent [19]

Kim

[11] Patent Number: 5,660,419
[45] Date of Patent: Aug. 26, 1997

[54] CONNECTING MEMBER FOR EXHAUST PIPE

[75] Inventor: Yong-ho Kim, Seoul, Rep. of Korea

[73] Assignee: Sung Jin Machinery Co., Ltd., Ansan, Rep. of Korea

[21] Appl. No.: 568,686

[22] Filed: Dec. 7, 1995

[30]    Foreign Application Priority Data

Dec. 28, 1994 [KR] Rep. of Korea ............... UM94-36920

[51] Int. Cl.⁶ .................. F16L 13/02; F16L 27/111
[52] U.S. Cl. ............... 285/226; 285/301; 285/114; 285/903; 138/109
[58] Field of Search .................. 285/226, 227, 285/299, 300, 301, 47, 114, 903; 138/109, 121; 92/34, 37, 42, 43

[56]    References Cited

U.S. PATENT DOCUMENTS

| 2,216,468 | 10/1940 | Farrar | 285/226 |
|---|---|---|---|
| 2,666,657 | 1/1954 | Howard et al. | 285/226 |
| 2,707,117 | 4/1955 | Fentress et al. | 285/226 |
| 2,713,503 | 7/1955 | Ekholm | 285/226 |
| 4,415,185 | 11/1983 | Vinciguerra et al. | 285/226 |
| 4,911,206 | 3/1990 | Gropp et al. | 285/226 |
| 5,145,215 | 9/1992 | Udell | 285/226 |
| 5,263,747 | 11/1993 | Lefebvre et al. | 285/226 |

FOREIGN PATENT DOCUMENTS

| 282689 | 9/1988 | European Pat. Off. | 285/226 |
|---|---|---|---|
| 0 410 089 | 1/1991 | European Pat. Off. | |
| 565466 | 10/1993 | European Pat. Off. | 285/226 |
| 864574 | 4/1941 | France | 285/226 |
| 1300079 | 6/1962 | France | 285/226 |

*Primary Examiner*—Eric K. Nicholson
*Attorney, Agent, or Firm*—Wenderoth, Lind & Ponack

[57]    ABSTRACT

A connecting means for an exhaust pipe of a vehicle includes a bellows member made of metallic material and cylindrically corrugated for absorbing the deformation force due to the expansion and contraction of the exhaust pipe, an interlock member spirally formed on the inside of the bellows member and having spiral grooves for absorbing the deformation force due to the expansion and contraction of the exhaust pipe, a braid member for surrounding the outside of the bellows member, a cap for pressing an end part of the braid member, and a fixing member for combining the end parts of the bellows member and the interlock member. The fixing member includes a ring-shaped intermediate member one end part of which is welded under one end part of the bellows member, and the other end part of which is extended to be overlapped with the end part of the interlock member and provided with spiral protuberances to be fitted into the spiral grooves of the interlock member. Thereby, the service life of the connecting means is extended and product reliability is improved.

10 Claims, 3 Drawing Sheets

CONNECTING MEMBER FOR EXHAUST PIPE

BACKGROUND OF THE INVENTION

This invention relates to a connecting means for an exhaust pipe of a vehicle which has long life and improved product reliability.

Generally, an exhaust pipe is connected to an engine of a vehicle by a connecting means to absorb vibration, impact, and thermal deformation due to exhaust gas of high temperature from the engine.

EP 0410089 A1 discloses a connecting means comprising a bellows member made of metallic material and cylindrically corrugated to absorb the deformation force caused by expansion and contraction or bending of the exhaust pipe, an interlock member for absorbing the deformation force and controlling displacement within the elasticity limit of the bellows member to make the flow of the exhaust gas smooth and protect the bellows member from the exhaust gas of high temperature, and a braid member surrounding the bellows member. Opposite end parts of the bellows member, the interlock member and the braid member are pressed with caps circumferentially and spot-welded.

One end of the connecting means is connected to the exhaust pipe and the other end is connected to the engine, so that the exhaust gas may flow from the engine into the pipe and the impact or deformation caused between the engine and the exhaust pipe may be absorbed by the flexible or elastic bellows member and the interlock member.

The interlock member is manufactured in the form of a continuous spiral loop and cut to an appropriate length to be fixed with the bellows member. The fixing method greatly influences on the durability and the noise of the connecting means.

The durability of the above connecting means is determined by fixing means for integrally combining end parts of the bellows member and the interlock member.

Therefore, means for fixing the absorbing means such as the interlock member and the bellows member becomes one of the most important factors influencing durability and reliability.

SUMMARY OF THE INVENTION

The object of the present invention is to provide a connecting means for an exhaust pipe which supplies strong binding force between the interlock member and the bellows member and has long life.

According to the present invention, the connecting means for an exhaust pipe of a vehicle comprises a bellows member made of metallic material and cylindrically corrugated for absorbing the deformation force due to the expansion and contraction of the exhaust pipe; an interlock member spirally formed on the inside of the bellows member forming spiral grooves for absorbing the deformation force due to the expansion and contraction of the exhaust pipe; a braid member for surrounding the outside of the bellows member; a can for pressing the end part of the braid member; and a fixing member for combining the end parts of the bellows member and the interlock member. The fixing member includes a ring-shaped intermediate member one end part of which is welded under one end part of the bellows member, and the other end part of which is extended to be overlapped with the end part of the interlock member and provided with spiral protuberances to be fitted into spiral grooves of the interlock member.

The intermediate member functions as a medium between the bellows member and the interlock member at both end parts thereof, thus defining a space between the inside of the bellows member and the outside of the interlock member. The size of the space depends on the thickness of the intermediate member. Due to this intermediate member, it is possible to prevent the direct contact of the bellows member with the interlock member, while both members absorb the deformation force of an exhaust vice, and to prevent the detachment of the interlock member from the bellows member even when the expansion and contraction of the connecting means of the exhaust pipe occurs. Thereby, the life of the connecting means of the exhaust pipe can be extended.

BRIEF DESCRIPTION OF THE DRAWINGS

The invention will now be described by way of example with reference to the accompanying drawings, in which.

DETAILED DESCRIPTION OF THE PREFERRED EMBODIMENTS

Figure 1:
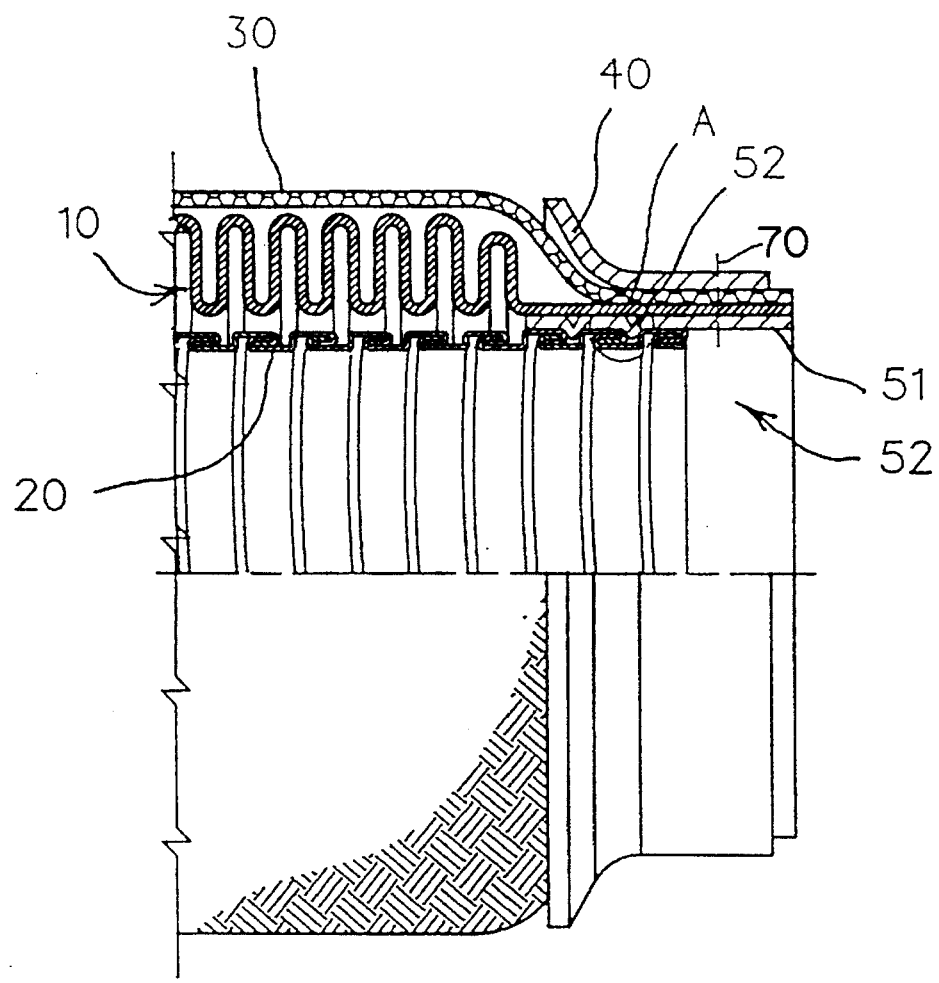
FIG. 1 is a cross-sectional view partially showing a connecting means for an exhaust pipe of vehicles according to a preferred embodiment of the present invention.

FIG. 1 shows a preferred embodiment of the connecting means for an exhaust pipe of a vehicle according to the present invention. In FIG. 1, the connecting means for the exhaust pipe including a repeatedly corrugated bellows member 10, an interlock member 20 located on the inside of the bellows member 10, a braid member 30 surrounding the bellows member 10, cap 40 for pressing the end parts of the braid member 30 and a fixing member 50, is characterized in that an intermediate member 51 which forms an extension of the fixing member 50 is interposed between the bellows member 10 and the interlock member 20, and an extended end part of the intermediate member 51 is combined with the interlock member 20 by fitting spiral protuberances 52 of the intermediate member 51 into spiral grooves 21 of the interlock member 20.

The outside of the intermediate member 51 is fixed at one end part of the bellows member 10 by welding, where the horizontal end part of the bellows member 10, the braid member 30 and the cap 40 are sequentially overlaid and spot-welded at several places simultaneously, one of which is shown schematically at 70 in FIG. 1. A part of the inside of the intermediate member 51 is fixed by fitting the spiral protuberances 52 into the spiral grooves 21 of the interlock member 20. In order to increase the binding force in the above structure, spot welding may be additionally provided on the spots where the intermediate member 51 is engaged with or fitted into the interlock member 20, e.g. as shown schematically at 80 in FIG. 3.

In FIG. 1, the spiral protuberances 52 are made in the cross-sectional form of rounded triangles from inward deformation of members 51 that protrude inwardly from the intermediate member 51 to form space for receiving the interlock member 20, and accordingly the outside of the interlock member 20 serves as male member and the intermediate member 51 serves as a female member.

Therefore, due to the intermediate member 51 fixed on the interlock member 20 by performing both the spiral fitting and the spot-welding, the interlock member 20 is prevented from being damaged or detached from the bellows member 10 in the horizontal direction of the drawing.

Figure 2:
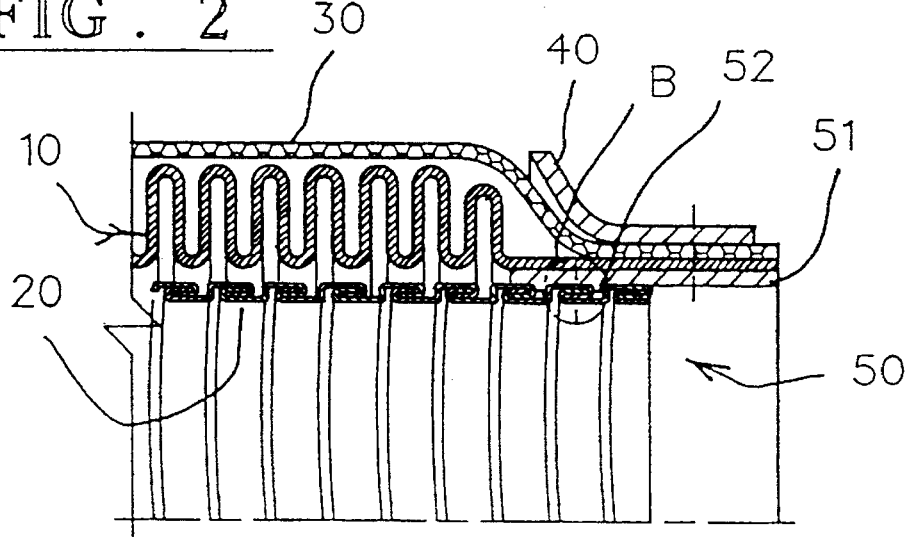
FIG. 2 is a cross-sectional view partially showing a connecting means for an exhaust pipe of vehicles according to another preferred embodiment of the present invention.

FIG. 2 shows another embodiment of the connecting means for the exhaust pipe according to the present invention. In FIG. 2, the spiral protuberances 52 are formed, not be a deformation of the intermediate member 51 as in the first embodiment, but by a plastic cutting operation in an angular shape fitted into the grooves 21 of the interlock member 20, where the intermediate member 51 serves as the female member and the outside of the interlock member 20 serves as the male member. The shape of the protuberances is the only difference from the embodiment of FIG. 1.

Figure 3:
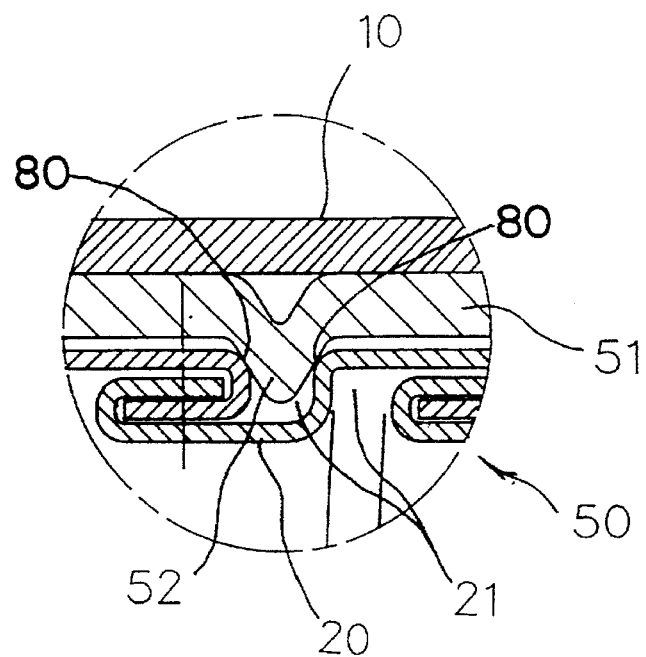
FIG. 3 is an enlarged view showing area A of FIG. 1.
Figure 4:
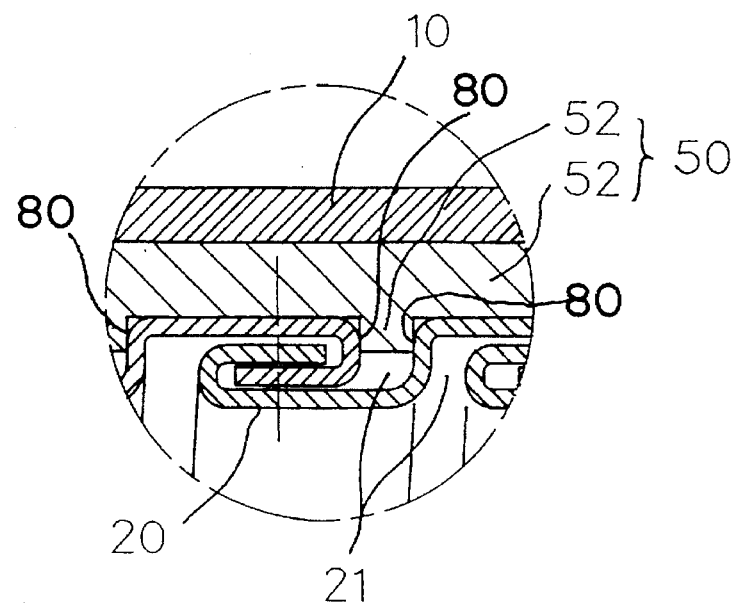
FIG. 4 is an enlarged view showing area B of FIG. 2.

FIG. 3 and FIG. 4 show respective enlarged views of area A of FIG. 1 and area B of FIG. 2, in which the above structures of the connecting means become more apparent.

Figure 5:
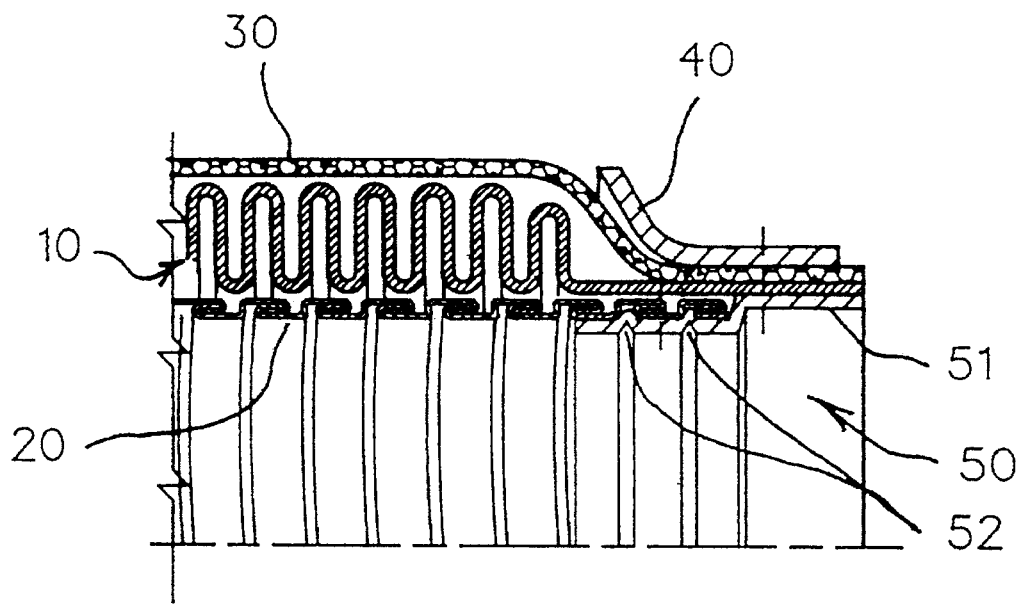
FIG. 5 and FIG. 6 are partial cross-sectional views respectively showing further embodiments of the present invention.

FIG. 5 shows a still further embodiment of the present invention in which the intermediate member 51 is extended to be overlaid under or inwardly of the interlock member 20. The spiral protuberances 52 are in the form of rounded triangles and protrude outwardly under the interlock member 20 to be fitted into the spiral grooves 21 of the interlock member 20, where the intermediate member 51 serves as the male member and the spiral grooves serve as the female member, and the binding force is almost the same as the former embodiments.

Figure 6:
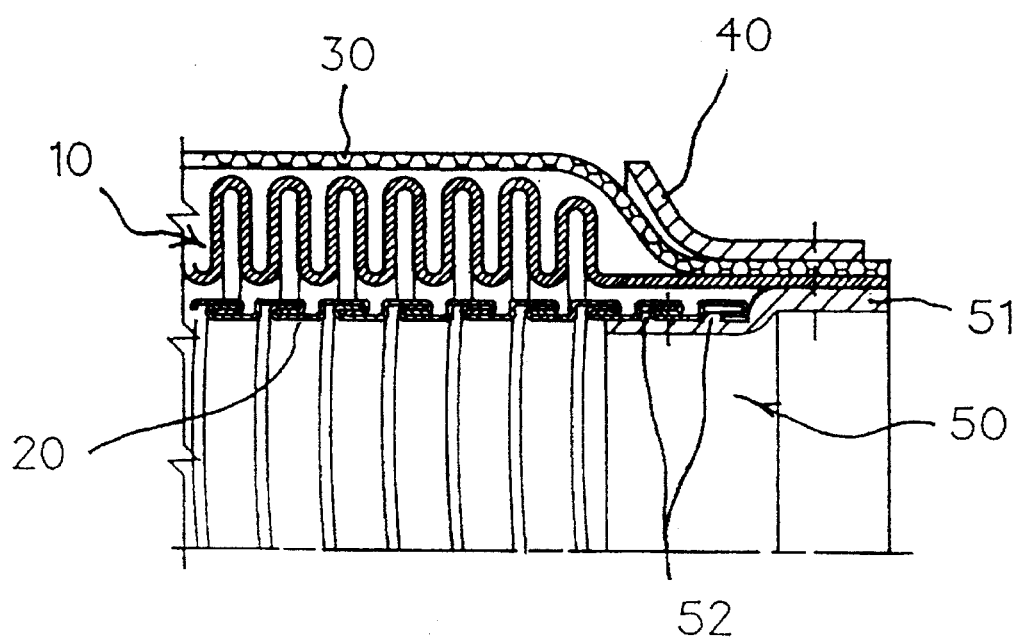

FIG. 6 shows a further embodiment of the present invention. The protuberances 52 of an extension of the intermediate member 51 are formed in an angular form as in the embodiment of FIG. 2. The only difference from the embodiment of FIG. 5 is the shape of the protuberances.

According to the present invention as described above, the connecting means for the exhaust pipe improves the binding force of the interlock member to the bellows member resulting from spiral joining with the interlock member and spot welding to the both members.

As a consequence, the connecting means for the exhaust pipe according to the present invention has long life with improved product reliability since direct abrasion or thermal conduction between the bellows member 10 and the interlock member 20 is prevented by interposing the intermediate member 51 to secure a safety space therebetween.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

What is claimed is:

1. Connecting means for an exhaust pipe of a vehicle, said connecting means comprising:

a bellows member made of metallic material and cylindrically corrugated for absorbing the deformation force due to the expansion and contraction of the exhaust pipe;

an interlock member spirally formed on the inside of said bellows member and having spiral grooves for absorbing the deformation force due to the expansion and contraction of the exhaust pipe;

a braid member for surrounding the outside of said bellows member;

a cap for pressing an end part of said braid member; and a fixing member for combining end parts of said bellows member and said interlock member, said fixing member including a ring-shaped intermediate member having one end part welded under one end part of said bellows member and another end part which is extended to be overlapped with said end part of said interlock member and provided with spiral protuberances to be fitted into said spiral grooves of said interlock member.

2. The connecting means for an exhaust pipe of a vehicle according to claim 1, wherein said spiral protuberances of said intermediate member are inwardly protruded from said intermediate member to form space for receiving said interlock member, an outside of said interlock member serves as a male member and said intermediate member serves as a female member.

3. The connecting means for an exhaust pipe of a vehicle according to claim 1, wherein said spiral protuberances are outwardly protruded from said intermediate member under said interlock member to be fitted into said spiral grooves of said interlock member, said intermediate member serves as a male member and said spiral grooves of said interlock member serve as a female member.

4. The connecting means for an exhaust pipe of a vehicle according to claim 1, wherein said spiral protuberances are formed inwardly by a plastic cutting operation to have an angular form to make space for receiving said interlock member, said intermediate member serves as a female member and an outside of said interlock member serves as a male member.

5. The connecting means for an exhaust pipe of a vehicle according to claim 1, wherein said spiral protuberances of said intermediate member are outwardly formed in an angular shape under said interlock member to be fitted into said spiral grooves of said interlock member, said intermediate member serves as a male member and said spiral grooves serves as a female member.

6. The connecting means for an exhaust pipe of a vehicle according to claim 5, wherein said intermediate member is spot-welded to said interlock member at several places whereat said interlock member and said intermediate member overlap with each other.

7. The connecting means for an exhaust pipe of vehicles according to claim 2, the intermediate member is spot-welded at several places in the overlapping part with the interlock member.

8. The connecting means for an exhaust pipe of vehicles according to claim 3, the intermediate member is spot-welded at several places in the overlapping part with the interlock member.

9. The connecting means for an exhaust pipe of vehicles according to claim 4, the intermediate member is spot-welded at several places in the overlapping part with the interlock member.

10. The connecting means for an exhaust pipe of vehicles according to claim 5, the intermediate member is spot-welded at several places in the overlapping part with the interlock member.

* * * * *